United States Patent
Sano et al.

(10) Patent No.: US 10,589,189 B2
(45) Date of Patent: Mar. 17, 2020

(54) SOLID/LIQUID SEPARATION APPARATUS, AND METHOD FOR SAME

(71) Applicant: Hitachi, Ltd., Tokyo (JP)

(72) Inventors: Tadashi Sano, Tokyo (JP); Sachio Sekiya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 658 days.

(21) Appl. No.: 14/903,683

(22) PCT Filed: Aug. 2, 2013

(86) PCT No.: PCT/JP2013/070962
§ 371 (c)(1),
(2) Date: Jan. 8, 2016

(87) PCT Pub. No.: WO2015/015631
PCT Pub. Date: Feb. 5, 2015

(65) Prior Publication Data
US 2016/0158763 A1 Jun. 9, 2016

(51) Int. Cl.
*B01D 11/02* (2006.01)
*B03C 1/005* (2006.01)
(Continued)

(52) U.S. Cl.
CPC ...... *B01D 11/0296* (2013.01); *B01D 11/0288* (2013.01); *B03B 5/48* (2013.01);
(Continued)

(58) Field of Classification Search
CPC ... B03B 5/48; B01D 11/0296; B01D 11/0288; B01D 3/40; C02F 11/12; C02F 2101/32; C02F 2209/42; C07C 7/08; C07C 7/10; C07G 7/08; B03C 1/005
See application file for complete search history.

(56) References Cited

U.S. PATENT DOCUMENTS 3,070,463 A * 12/1962 Barday .................... B01D 1/00
134/11
4,499,743 A * 2/1985 Maestrelli ............ D06F 43/086
68/18 C
(Continued)

FOREIGN PATENT DOCUMENTS

WO      03/101579 A1   12/2003
WO   2008/111483 A1    9/2008

OTHER PUBLICATIONS

International Search Report of PCT/JP2013/070962.

*Primary Examiner* — Youngsul Jeong
*Assistant Examiner* — Gabriel E Gitman
(74) *Attorney, Agent, or Firm* — Mattingly & Malur, PC

(57) ABSTRACT

The solid-liquid separator that uses the substance A capable of dissolving water and oil, and performs dehydration and deoiling from an object to be treated by bringing a mixture of water and a solid, oil and a solid, or water, oil and a solid that is an object to be treated, and the substance A in a liquid state into contact with each other, and subsequently evaporating the substance A, includes a substance B that circulates while causing change of state in a closed system, a compressor that compresses the substance B, a first heat exchanger that exchanges condensation heat of the substance B and evaporation heat of the substance A, an expansion valve that decompresses the substance B which is condensed, and a second heat exchanger that exchanges evaporation heat of the substance B and condensation heat of the substance A.

5 Claims, 3 Drawing Sheets

(51) Int. Cl.
    *C02F 11/12*     (2019.01)
    *B03B 5/48*     (2006.01)
    *B01D 3/40*     (2006.01)
    *C02F 101/32*     (2006.01)

(52) U.S. Cl.
    CPC .............. B03C 1/005 (2013.01); C02F 11/12 (2013.01); *B01D 3/40* (2013.01); *C02F 2101/32* (2013.01); *C02F 2209/42* (2013.01)

(56) References Cited

U.S. PATENT DOCUMENTS

| | | | | |
|---|---|---|---|---|
| 4,545,134 | A * | 10/1985 | Mukerjee | B01D 5/0027 34/242 |
| 5,327,751 | A * | 7/1994 | Biagi | D06F 43/08 68/18 C |
| 5,630,913 | A * | 5/1997 | Tajer-Ardebili | B01D 3/007 159/901 |
| 2002/0182722 | A1* | 12/2002 | Corr | B01D 1/2846 435/309.1 |
| 2003/0057165 | A1* | 3/2003 | Carson | B01D 3/007 210/774 |
| 2005/0011543 | A1* | 1/2005 | Haught | B01D 17/047 134/42 |
| 2005/0210701 | A1 | 9/2005 | Kanda et al. | |
| 2009/0166175 | A1* | 7/2009 | Waibel | B01D 3/007 203/49 |
| 2009/0272702 | A1* | 11/2009 | Yen | B01D 29/23 210/806 |
| 2010/0101928 | A1 | 4/2010 | Kanda et al. | |
| 2013/0225838 | A1* | 8/2013 | Lee | B01D 11/0488 549/87 |

* cited by examiner

SOLID/LIQUID SEPARATION APPARATUS, AND METHOD FOR SAME

TECHNICAL FIELD

The present invention relates to a solid-liquid separator that separates a liquid and a solid, and a solid-liquid separating method.

BACKGROUND ART

As the prior art relating to the present invention, Patent Literature 1 and Patent Literature 2 are cited.

Patent Literature 1 discloses a configuration that removes water from coal containing the water by using a cycle of change of state of a substance (hereinafter, called a substance A) that is a gas under a normal temperature and a normal pressure, and can dissolve water and oil in a liquefied state.

Patent Literature 2 discloses a heat source that is used in the cycle of the change of state of the above described substance A and a using method thereof.

CITATION LIST

Patent Literature

Patent Literature 1: WO 2003/101579
Patent Literature 2: WO 2008/111483

SUMMARY OF INVENTION

Technical Problem

As the substance A which is a gas under the normal temperature and pressure, and can dissolve water and oil when being liquefied, various substances are cited. Patent Literature 1 is disclosed as a solid-liquid separating method using the characteristic of the substance A. In Patent Literature 1, DME (dimethyl ether) is selected as an example of the substance A, and is used in removal of water in coal. In this case, a compressor is used when the state of DME is changed, and as the compressor to be used here, an oil-free type needs to be selected. As the types of oil-free compressors, a turbo refrigerator, a screw refrigerator, a reciprocating refrigerator and the like are cited, but a commercially proper compressor is not present, because these types of oil-free compressors have the problem that the minimum treatment amount is too large, the maintenance interval is too short or the like, with respect to solid-liquid separation using the substance A.

Further, in order to operate the cycle efficiently, the amount of DME that circulates in the cycle needs to be kept appropriate. However, if the DME amount in the cycle is large, a liquid phase that is unfavorable disadvantageous to heat exchange is generated in an heat exchanger, whereas if the DME amount is small, a gas-liquid two-phase flow is generated in a position where a liquid phase should be present in the cycle, and the efficiency of the cycle is reduced. Accordingly, the proper amount of DME with high efficiency needs to be calculated comprehensively with use of a P-H diagram from measured temperatures, pressures, flow rates and the like, although the range of the proper amount of DME with high efficiency is narrow, and it is difficult to accurately grasp and control the DME amount in the cycle.

Patent Literature 2 discloses a configuration that uses the heat of an external environment in supply of condensation heat and evaporation heat of the DME. However, if an external medium having a temperature suitable for the state change cycle of DME is not obtained, the efficiency of the configuration significantly reduces. Further, even when an external medium with a suitable temperature is obtained, the heat exchange efficiency is low as compared with Patent Literature 1 because sensible heat of the individual medium is used, and therefore, the heat exchanger needs to be upsized. Further, when an external heat medium which depends on an environment is used as a heat source, impurities are often contained in the external heat medium and accordingly bring about contamination and clogging to an external medium side of the heat exchanger to reduce heat exchange efficiency, and therefore, maintenance with high frequency is required.

Consequently, the present invention provides a solid-liquid separator that can carry out change of state of a substance A with high efficiency and with low maintenance frequency.

Solution to Problem

In order to solve the above described problem, the present invention is a solid-liquid separator that uses a substance A capable of dissolving water and oil, and performs dehydration and deoiling from an object to be treated that is a mixture of water and a solid, oil and a solid, or water, oil and a solid that is an object to be treated, and the solid-liquid separator includes a substance B that circulates while causing change of state in a closed system, a compressor that compresses the substance B, a first heat exchanger that exchanges condensation heat of the substance B and evaporation heat of the substance A, expansion means that, decompresses the substance B which is condensed, a second heat exchanger that exchanges evaporation heat of the substance B and condensation heat of the substance A, a treatment tank in which the condensed substance A which is condensed in the second heat exchanger after the substance A evaporates while separating from water or oil in the first heat exchanger, and the object to be treated are mixed, and a pump that circulates the substance A.

Further, the present invention is the solid-liquid separator, wherein between the first heat exchanger that condenses the substance B and the expansion means, a third heat exchanger that uses external air or cooling water is provided to control a temperature of the substance B.

Furthermore, the present invention is the solid-liquid separator, wherein in order to separate a magnetic substance while keeping a mixture of a solid containing the magnetic substance as the object to be treated dispersing in the substance A, a magnetic separating device is installed in an inside of the treatment tank, or on a channel which extracts the object to be treated from the treatment tank.

Further, the present invention is the solid-liquid separator, wherein the first heat exchanger is of a shell and tube type, and a liquid level sensor that detects a liquid level of a water layer or an oil layer that precipitates at a lower portion of a shell is installed.

Further, the present invention is the solid-liquid separator, wherein the second heat exchanger is of a shell and tube type, and a liquid level sensor that detects a liquid level of the substance A that precipitates at a lower portion of a shell is installed.

Further, in order to solve the above described problem, the present invention is a solid-liquid separating method that uses a substance A capable of dissolving water and oil, and performs dehydration and deoiling from an object to be treated that is a mixture of water and a solid, oil and a solid, or water, oil and a solid that is an object to be treated, including circulating a substance B that causes change of state in a closed system, compressing the substance B, exchanging condensation heat of the substance B and evaporation heat of the substance A by first heat exchanger means, decompressing the substance B which is condensed, exchanging evaporation heat of the substance B and condensation heat of the substance A by second heat exchanging means, and mixing the condensed substance A which is a condensed in the second heat exchanging means after the substance A evaporates while separating from water or oil in the first heat exchanger, and the object to be treated.

Furthermore, the present invention is the solid-liquid separating method, wherein between the first heat exchanging means and the expansion means, third heat exchanging means that uses external air or cooling water is provided to control a temperature of the substance B.

Further, the present invention is the solid-liquid separating method, wherein in order to separate a magnetic substance while keeping a mixture of a solid containing a magnetic substance as the object to be treated dispersing in the substance A, magnetic separating means is provided on a channel after the substance A is condensed in the second heat exchanging means.

Further, the present invention is the solid-liquid separating method, wherein as the first heat exchanging means, a shell and tube type heat exchanger is adopted, and liquid level sensor means that detects a liquid level of a water layer or an oil layer that precipitates at a lower portion of a shell of the heat exchanger is installed.

Further, the present invention is the solid-liquid separating method, wherein as the second heat exchanging means, a shell and tube type heat exchanger is adopted, and liquid level sensor means that detects a liquid level of the substance A that precipitates at a lower portion of a shell of the heat exchanger is installed.

Advantageous Effects of Invention

According to the present invention, in the apparatus and the method that perform solid-liquid separation by using the cycle of change of state of the substance A which is a gas under a normal temperature and a normal pressure, the solid-liquid separator and the solid-liquid separating method can be provided, which can carry out the change of state of the above described substance in a proper treatment amount, can extend the maintenance interval of the apparatus, further can easily grasp and control the amount of the substance A in the cycle and is capable of an efficient operation.

DESCRIPTION OF EMBODIMENTS

Hereinafter, embodiments of the present invention will be described with reference to the drawings.

Embodiment 1

A solid-liquid separator, and a solid-liquid separating method of the present invention can separate a mixture of a solid, water and oil into the solid, water and oil respectively. Further, the solid-liquid separator and the solid-liquid separating method of the present invention also can be used for a combination of a solid and water, and a combination of a solid and oil. More specifically, the solid-liquid separator and the solid-liquid separating method can be applied to various kinds of solid-liquid separation such as separation of water, oil and a solid of sludge generated in water treatment, purification of soil contaminated with oil, dehydration/deoiling from plankton, and desorption of impurities adsorbed by active carbon that is used in water treatment.

While a mode for carrying out the solid-liquid separator and the solid-liquid separating method of the present invention will be described hereinafter with an active carbon regenerating apparatus cited as an example, the product to which the present invention is applied is not limited to the active carbon regenerating apparatus and an active carbon regenerating method.

Figure 1:
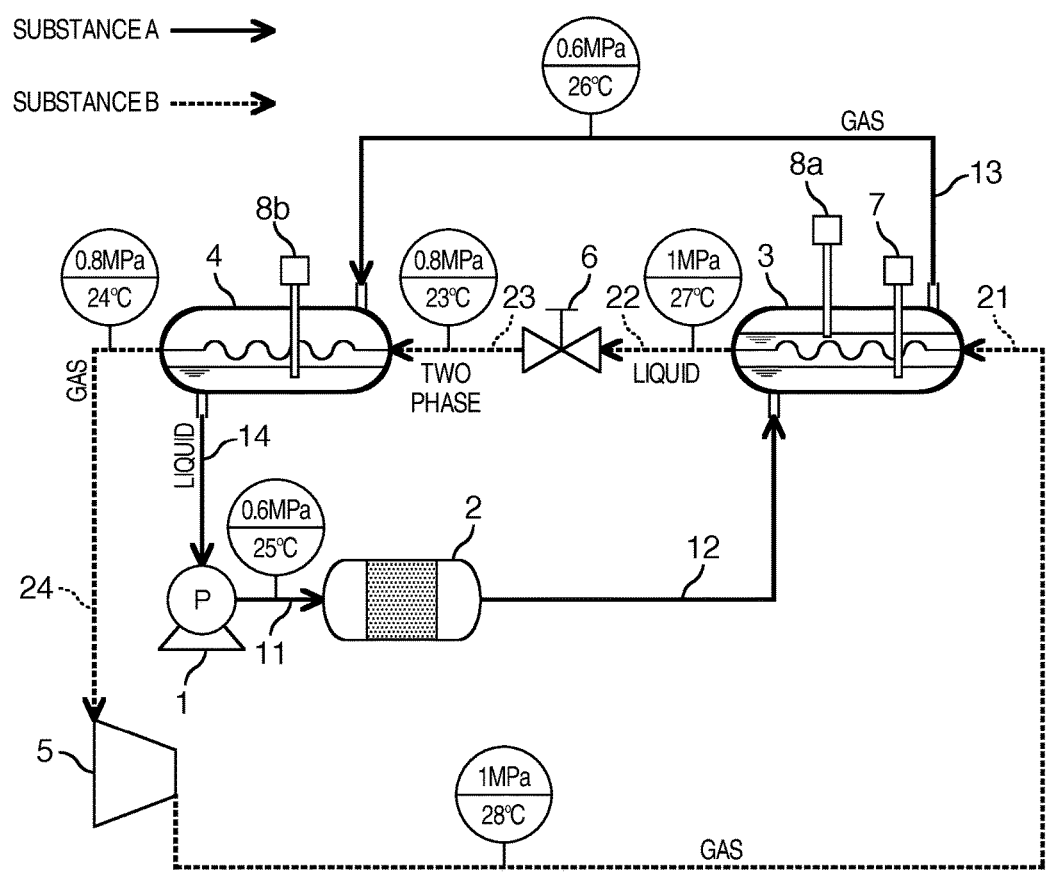
FIG. 1 is an example of a configuration diagram of a solid-liquid separator of the present invention.

A configuration of the active carbon regenerating apparatus which is one of the application targets of the present invention will be described with use of FIG. 1. In the present embodiment, an example of using dimethyl ether (DME) as a substance A that can dissolve water and oil, and using chlorofluorocarbon as a substance (hereinafter, called a substance B) that circulates while causing change of state in a closed system is shown. Further, the example is shown, in which two shell-and-tube type heat exchangers are used, and both of them pass DME to a shell side.

First, liquefied DME is fed to a treatment tank 2 charged with used active carbon via a piping 11 from a pump 1. In the treatment tank 2, impurities such as oil adhering to the active carbon are dissolved into DME together with water adhering thereto. The impurities and water are fed to a first heat exchanger 3 through a piping 12 as the impurities and water stay dissolved in the liquefied DME. Since chlorofluorocarbon with a temperature higher than that of the liquefied DME is continuously supplied to the first heat exchanger 3, the liquefied DME is heated to a boiling point of DME or a higher temperature by latent heat and sensible heat of chlorofluorocarbon, and the liquefied DME becomes a DME gas and is discharged. Most of the water and impurities which are dissolved and remain in the liquefied DME stay inside the first heat exchanger 3 without evaporating, because the temperature at this time is the boiling points of the water and impurities or lower. The DME gas with high purity which is discharged is fed to a second heat exchanger 4 via a piping 13. Since chlorofluorocarbon with a temperature lower than that of the liquefied DME is continuously supplied to the second heat exchanger 4, the DEM gas is cooled to the boiling point of the DME or a lower temperature by the latent heat and sensible heat of chlorofluorocarbon, and the DME gas becomes liquefied DME and is discharged. The discharged liquefied DME is fed to the pump 1 via a piping 14, and a cycle of change of state of DME is formed.

Further, in the first heat exchanger 3, water and impurity concentrations gradually increase, and a substance such as water which is not completely mixed starts to precipitate. An increase amount of the precipitation amount is large immediately after an operation, and when a removal rate from active carbon becomes high, the precipitation amount gradually approaches zero. Accordingly, by continuously measuring a water level with a liquid level sensor 7, an end of cleaning of active carbon can be determined. Further, a liquid level sensor 8a is installed to detect a liquid level of DME. The liquid level of the liquefied DME is kept at a position that is lower than a discharge port for the DME gas, and is higher than a high temperature side piping (tube) of the heat exchanger, whereby outflow of the impurities is restrained, and high heat exchange efficiency can be kept.

In the second heat exchanger 4, a liquid level sensor 8b is installed to detect the liquid level of DME. The liquid level of liquefied DME is kept at a position that is higher than the discharge port of the DME gas and lower than a low temperature side piping (tube) of the heat exchanger, whereby outflow of a two-phase flow is restrained, and high heat exchange efficiency can be kept. Adjustment of the liquid level can be performed by change of the operation speed of the pump 1 or the compressor 5, and when excess and deficiency occur to the DME amount in the cycle, the excess and deficiency can be adjusted with a pump, a valve and the like by using a tank (not illustrated) that is installed outside the cycle.

Further, when an operation is started, the water in the treatment tank 2 decreases, and thereby, the DME amount in the cycle for keeping an efficient operation gradually becomes insufficient. However, in the conventional method which uses change of pressure for change of state of DME, formation of the liquid phase is confirmed by using a P-H diagram from the temperature and the pressure in the outlet of the condensing section after compression, but a proper amount cannot be confirmed unless the cycle is in an operating state. Further, while in the cycle of DME in the conventional method, the operation efficiency is enhanced more as the temperature difference between the evaporating section and the condensing section is made smaller, a supercooling degree after condensation becomes small if the temperature difference is reduced. Therefore, the possibility of DME being discharged as a two-phase flow becomes higher, and when an error of the measuring equipment is taken into consideration, it is difficult to continue a proper operation.

In contrast with this, in the embodiment according to the present invention, it is easy to grasp the DME amount in the cycle at the time of operation as described above, and even when the suitable cycle amount DME amount changes in accordance with the operation conditions, the DME amount can be immediately corrected to a proper amount.

Meanwhile, chlorofluorocarbon that supplies heat and cold energy to DME becomes a gas with a high temperature and a high pressure and is discharged from a compressor 5, and is fed to the first heat exchanger 3 via a piping 21. Here, chlorofluorocarbon with a high temperature transfers condensation heat to the DME side while condensing, and the liquefied DME uses the supplied heat as evaporation heat and becomes a DME gas. Liquefied chlorofluorocarbon passes through a piping 22, is decompressed by an expansion valve 6 and thereby has the temperature and the pressure reduced to form a two-phase flow to be fed to the second heat exchanger 4 via a piping 23. Here, the DME gas with a high temperature transfers condensation heat to the chlorofluorocarbon side while condensing, and the chlorofluorocarbon with a low temperature uses the supplied heat as evaporation heat to be a chlorofluorocarbon gas. The chlorofluorocarbon gas which is gas is fed to the compressor 5 via the piping 24, whereby a refrigeration cycle is formed.

Figure 2:
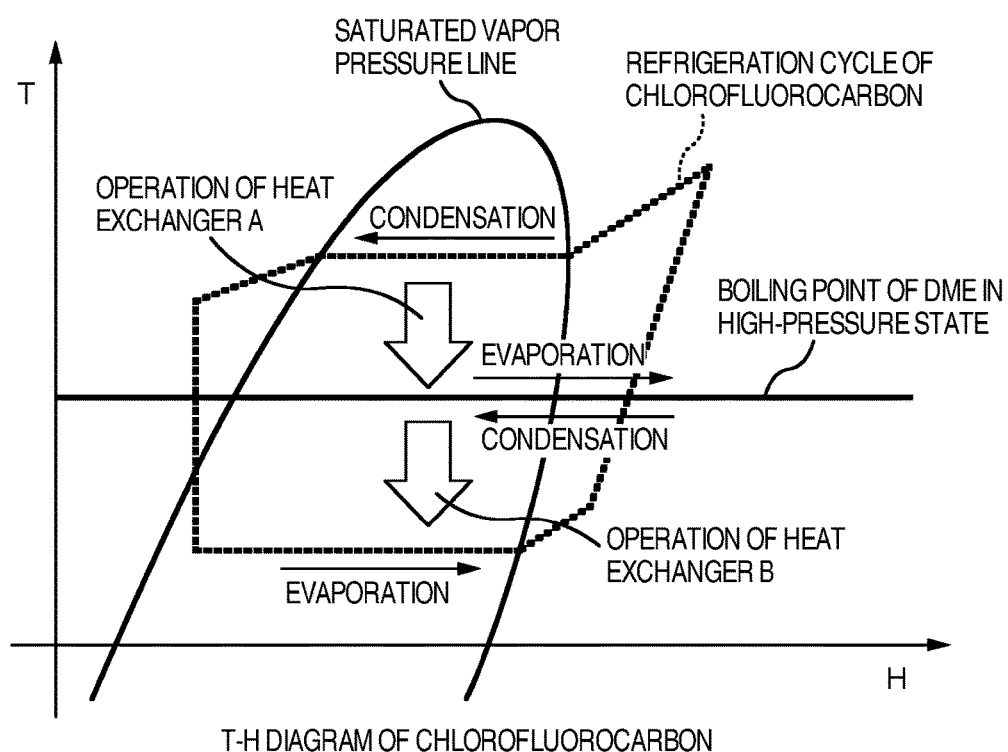
FIG. 2 is an example of a temperature-enthalpy diagram (a T-H diagram) showing change of state of each of two kinds of substances that are used in the present invention.

FIG. 2 is a diagram showing a relation of a T-H diagram illustrating a cycle of chlorofluorocarbon which is used in the present invention and DME. Chlorofluorocarbon follows processes of compression, condensation, expansion and evaporation similarly to an ordinary refrigeration cycle. In the condensation process among these processes, a large amount of latent heat is generated, and therefore, the heat is transferred to DME which has a lower temperature, and is used as evaporation heat for DME. Further, since evaporation latent heat becomes necessary in the evaporation process of chlorofluorocarbon, higher-temperature condensation heat for a DME gas is received. The pressure of DME at this time is always substantially constant except for an amount of pressure loss at a time of circulation. Since in the present invention, change of temperature is used instead of change of pressure, in order to carry out the state change cycle of DME as above, there is no need to use an expensive compressor exclusive to an organic gas, and the state change cycle of DME can be circulated with a less expensive pump for chemicals.

In the present invention, the circulation amounts are designed and controlled so that latent heats constitute most of the heat amounts that are transferred in the first heat exchanger 3 and the second heat exchanger 4, instead of sensible heats in both DME and chlorofluorocarbon, namely, the latent heats of DME and chlorofluorocarbon are preferably equal to each other. This is because the heat transfer coefficients at a boiling time and a condensing time are much higher than the heat transfer coefficients of a gas and a liquid, and this can enhance heat exchange efficiency and contribute to downsizing of the heat exchanger. Further, the refrigeration cycle of chlorofluorocarbon in this condition can make the temperature differences small unlike an air-conditioner for air conditioning, and the temperature of the condensation process only has to be made slightly higher than the boiling point of DME, whereas the temperature of the evaporation process only has to be made slightly lower than the boiling point of DME. Accordingly, loss at a compression time which is necessary for circulation of chlorofluorocarbon can be suppressed to be small, in addition to which, with respect to circulation of DME, the pressure loss that occurs when the cycle is circulated only has to be supplemented by a pump, and therefore, change of state of the substance A can be carried out efficiently as the entire apparatus.

In the active carbon regenerating apparatus of the present invention, the cycle of the change of state of DME is circulated a plurality of times. This is because the solubility in the liquefied DME differs depending on a substance, and substances which do not completely mix into the liquefied DME also exist, and the removal rate of impurities is enhanced by continuing to supply DME with high purity by circulating DME in order to sufficiently diffuse substances with low solubility.

The feature of the present invention is using a pump in the cycle of the change of state of DME. When a compressor is used as in the prior art, an oil-free compressor needs to be selected. While in an ordinary compressor, oil with the objective of lubrication of the compressor is mixed into a refrigerant, an ordinary compressor cannot be used in the present invention, because in the cycle which causes the change of state of DME, the oil is separated at the time of evaporation of DME, and stays halfway through the cycle. Further, while as the type of the oil-free compressor, there are a turbo refrigerator, a screw refrigerator, a reciprocating refrigerator and the like, the former two types each have the problem that an operable lower limit treatment amount is large since a gap is present in a bulkhead between a high pressure section and a low pressure section and leakage occurs, whereas the latter type has the problem that the sealant is present in the sliding section, and maintenance frequency is high due to abrasion, and therefore, a commercially suitable compressor is not present. In contrast with this, as the DME pump used in the present invention, an ordinary pump for chemicals is usable, and therefore, the configuration of the present invention can be easily carried out.

Further, while in the above described embodiment, as the regeneration solvent for active carbon, DME is cited as an example, substances such as ethyl methyl ether, formaldehyde, ketene, and acetaldehyde can achieve a similar object.

Furthermore, while as the refrigeration cycle at the heat source side that is used in the present invention, chlorofluorocarbon is used as an example, other refrigerants such as ammonia and isobutane can achieve a similar object.

Further, the temperatures and the pressures described in the drawing are examples described for explanation, and change depending on the operation conditions, and therefore, the present invention is not limited to the values.

Furthermore, at the time of start and at the time of end of the operation, charge/recovery of active carbon to/from the treatment tank 2 is required. At this time, the operation of the active carbon regenerating apparatus may be stopped and charge/recovery may be performed in a release state, but a charge tower for active carbon installed in the water treatment line is cut off from the water treatment line with a valve or the like, and is connected to the circulation line for DME, whereby the charge tower may be used as a substitute for the treatment tank 2.

Embodiment 2

There is a sludge reducing apparatus as another example of the present invention. The sludge to be a target of the present embodiment is a mixture which is configured by magnetic powder, oil, silt and water, and is generated when water polluted by oil in which oil is mixed is purified by a flocculation and magnetic separation method.

The sludge which is generated in water treatment is generally treated as an industrial waste, and therefore, is dehydrated by using a mechanical dehydrator such as a belt press to reduce the cost of waste disposal. However, the ratio of the water after dehydration is approximately 70%, and water constitutes the most part of dehydrated sludge.

Further, in a flocculation and magnetic separation method, magnetic powder is added to purify water, and therefore, magnetic powder mixes into sludge. Accordingly, if the magnetic powder can be recovered without being discarded, running cost can be reduced by reuse and reduction in sludge.

The sludge reducing apparatus of the present invention can obtain magnetic powder and silt from which adhering amounts of water and oil are significantly reduced, individually, by recovering water and oil in the sludge by liquefied DME, and can reduce the sludge treatment cost and running cost.

Figure 3:
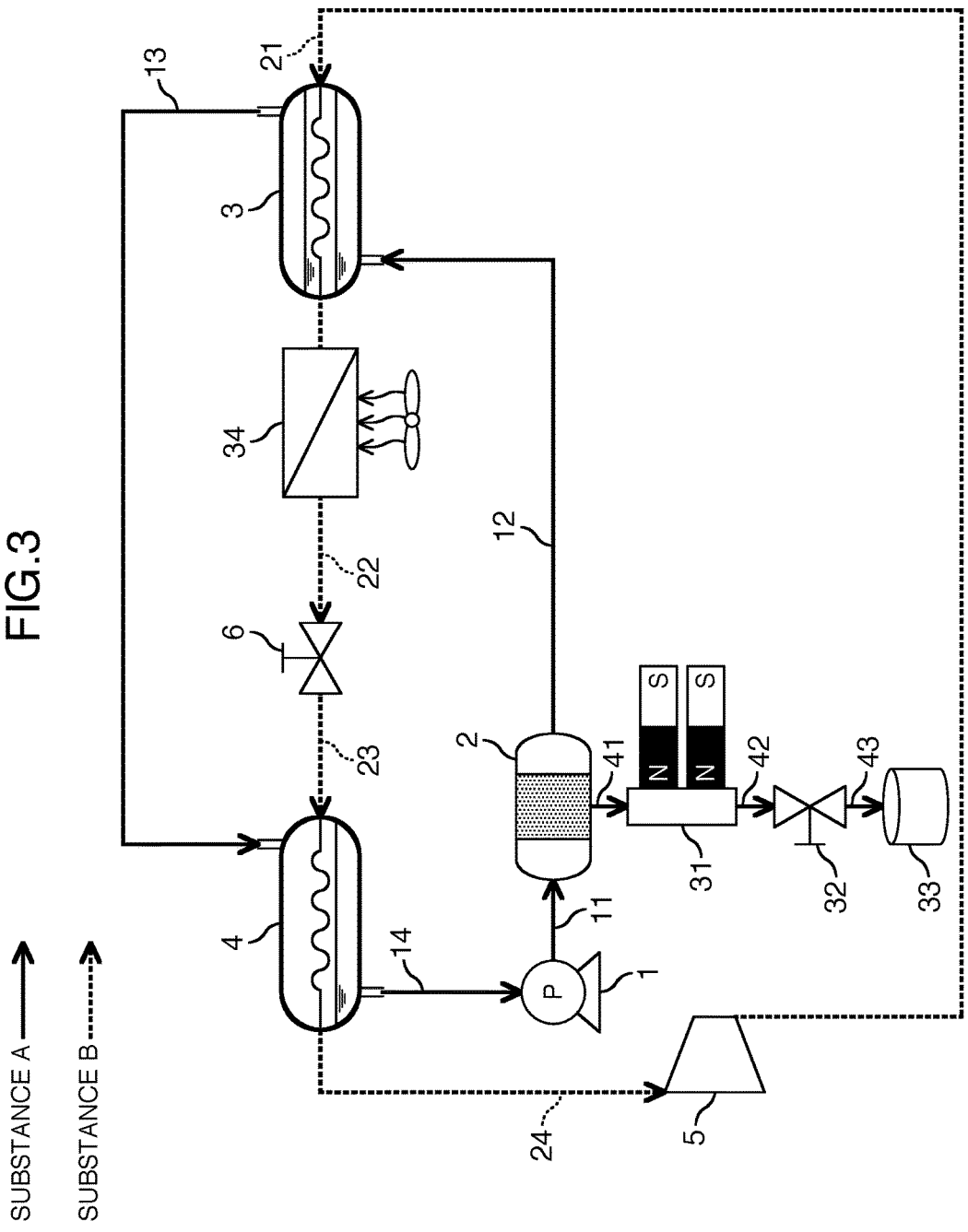
FIG. 3 is another example of the configuration diagram of the solid-liquid separator of the present invention.

Hereinafter, a configuration of the sludge reducing apparatus will be described with use of FIG. 3.

A circulation cycle of DME and a circulation cycle of chlorofluorocarbon in the sludge reducing apparatus are equivalent to those in the active carbon regenerating apparatus of the embodiment described above, and differ in that the matter charged in the treatment tank 2 is sludge instead of used active carbon.

When an object to be treated is sludge, oil and water stay in the first heat exchanger 3 by circulating DME. When treatment by circulation of DME is completed, silt and magnetic powder remain in the treatment tank 2 in a state in which the silt and the magnetic powder are dispersed in liquefied DME. When the solids are transported to a magnetic separating device 31 through a piping 41 together with the liquefied DME by operation of the pump 1 and a valve 32, the magnetic powder stays in the magnetic separating device 31 by a magnetic force, whereas the liquefied DME and silt are stored in a recovery tank 33 through a piping 42, the valve 32 and a piping 43. Next, pressures in the magnetic separating device 31 and inside the recovery tank are reduced, and the liquefied DME is evaporated, whereby magnetic powder and silt in which the adhering amounts of water and oil are significantly reduced can be obtained individually. Further, while magnets or electromagnets are installed outside the treatment tank 2 in this case, it is also possible to separate liquefied DME and silt by installing magnets or electromagnets inside the treatment tank 2, and discharging the liquefied DME and silt while holding magnetic powder with a magnetic force.

Further, since in the conventional method, decompression in the expansion valve is performed in the evaporation path of the liquefied DME, water and oil that precipitate at the time of passing the expansion valve easily form minute droplets, and form emulsion. Once water and oil form emulsion, gravity separation of the water and oil is difficult to carry out. However, since liquefied DME is evaporated by applying heat in the first heat exchanger 3 in the present invention, evaporation proceeds in a milder state as compared with evaporation by pressure reduction, and therefore, oil and water hardly form emulsion, and can be easily separated.

In the cycle of the present invention, the temperature in the cycle gradually increases due to loss in the refrigeration cycle, of chlorofluorocarbon. Accordingly, in order to reduce the temperature in the cycle, a heat exchanger using external air or cooling water is preferably installed. In the cycle of the present invention, a third heat exchanger 34 is installed halfway through the piping 22, whereby a liquid with a relatively high temperature and with a favorable heat transfer coefficient can be used in the apparatus as a high-temperature-side medium, and therefore, heat exchange with high efficiency can be performed.

Note that the present invention is not limited to the embodiments described above, and includes various modifications. For example, the above described embodiments are described in detail to describe the present invention to make the present invention easy to understand, and the present invention is not necessarily limited to including all of the described components. Further, some of the components of one embodiment can replace the components of the other embodiment, or to one embodiment, the components of the other embodiment can be added. Further, with respect to some of the components of each of the embodiments, addition of other components, deletion and replacement can be performed.

REFERENCE SIGNS LIST

1 PUMP
2 TREATMENT TANK
3 FIRST HEAT EXCHANGER
4 SECOND HEAT EXCHANGER
5 COMPRESSOR
6 EXPANSION VALVE
31 MAGNETIC SEPARATING DEVICE
33 RECOVERY TANK

The invention claimed is:

1. A solid-liquid separator that uses a substance A capable of dissolving water and oil, and performs dehydration and deoiling from an object to be treated that is a mixture of water and a solid, oil and a solid, or water, oil and a solid, the solid-liquid separator comprising:
   a treatment tank containing the object to be treated;
   a first heat exchanger;

a second heat exchanger;

a compressor;

an expansion valve;

a substance A flow path which circulates the substance A from the treatment tank to the first heat exchanger, from the first heat exchanger to the second heat exchanger, and from the second heat exchanger to the treatment tank, wherein the substance A flow path forms a single-loop closed system of flow from the treatment tank to the first heat exchanger, from the first heat exchanger to the second heat exchanger, and from the second heat exchanger to the treatment tank;

a pump to circulate the substance A through the substance A flow path; and a substance B flow path which circulates a substance B from the first heat exchanger to the expansion valve that decompresses the substance B which is condensed, from the expansion valve to the second heat exchanger, from the second heat exchanger to the compressor that compresses the substance B, and from the compressor to the first heat exchanger, in a closed system;

wherein the first heat exchanger exchanges condensation heat of the substance B and evaporation heat of the substance A;

wherein the second heat exchanger exchanges evaporation heat of the substance B and condensation heat of the substance A;

wherein the condensed substance A, which is condensed in the second heat exchanger after the substance A evaporates while separating from water or oil in the first heat exchanger, and the object to be treated, are mixed in the treatment tank;

wherein the solid in the object to be treated contains a magnetic substance; and wherein the solid-liquid separator further includes a magnetic separating device to separate the magnetic substance from the solid in the object to be treated.

2. The solid-liquid separator according to claim 1, wherein the magnetic separating device separates the magnetic substance from the solid in the object to be treated while keeping a mixture of the solid dispersed in the substance A.

3. The solid-liquid separator according to claim 1, wherein the magnetic separating device includes one or more magnets or electromagnets.

4. The solid-liquid separator according to claim 1, wherein the magnetic separating device is installed inside the treatment tank.

5. The solid-liquid separator according to claim 1, wherein the magnetic separating device is disposed outside the treatment tank and is connected to the treatment tank to receive the object to be treated from the treatment tank and separate the magnetic substance from the solid in the object to be treated.

* * * * *